US007839856B2

(12) United States Patent
Sinha et al.

(10) Patent No.: US 7,839,856 B2
(45) Date of Patent: Nov. 23, 2010

(54) CENTRALLY CONTROLLED ROUTING WITH TAGGED PACKET FORWARDING IN A WIRELESS MESH NETWORK

(75) Inventors: Santanu Sinha, Cupertino, CA (US); Robert B. O'Hara, Jr., Santa Clara, CA (US); Shahriar I. Rahman, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 513 days.

(21) Appl. No.: 11/758,990

(22) Filed: Jun. 6, 2007

(65) Prior Publication Data

US 2008/0304485 A1 Dec. 11, 2008

(51) Int. Cl.
*H04L 12/28* (2006.01)
(52) U.S. Cl. ........................................ 370/392; 370/389
(58) Field of Classification Search .................. None
See application file for complete search history.

(56) References Cited

U.S. PATENT DOCUMENTS

| | | | | |
|---|---|---|---|---|
| 5,872,783 | A | 2/1999 | Chin | 370/392 |
| 5,917,820 | A | 6/1999 | Rekhter | 370/392 |
| 5,991,300 | A | 11/1999 | Tappan | 370/392 |
| 6,111,673 | A | 8/2000 | Chang et al. | 359/123 |
| 6,636,499 | B1 * | 10/2003 | Dowling | 370/338 |
| 2005/0094585 | A1 | 5/2005 | Golden et al. | 370/310 |
| 2008/0304485 | A1 * | 12/2008 | Sinha et al. | 370/392 |

OTHER PUBLICATIONS

Liwen Chu, Kyeong Soo Kim, Jan Kruys, Shah Rahman, and George Vlantis, "6-address scheme for TGs mesh," IEEE 802.11 Working Group on Wireless Local Area Networks, Document IEEE 802.11-06/0841r4, Jul. 17, 2006.
International Engineering Consortium: "MPLS Tutorial." available from the IEC at www.IEC.org. Retrieved on Mar. 7, 2007 at www.webproforum.com/online/tutorials/mpls.
W. S.Conner, J. Kruys, K. Kim, J. C. Zuniga, "IEEE 802.11s Tutorial," presented at IEEE 802 Plenary, Dallas, TX, Monday, Nov 13, 2006. Retrieved on Apr. 9, 2007 at www.ieee802.org/802_tutorials/nov06/802.11s_Tutorial_r5.pdf.
D. Gupta, J. LeBrun, P. Mohapatra, C-N. Chuah, "A WDS-based Layer-2 Routing Scheme for Wireless Mesh Networks," ACM International Workshop on Wireless Testbeds, Experimental Evaluation and Characterization (WiNTECH), in conjunction with ACM MobiCom, Sep. 2006. Retrieved Apr. 9, 2007 at http://www.ece.ucdavis.edu/~chuah/paper/2006/wintech06-wds-routing.pdf.
Vijayarangam Subramanian and S. Ganesan, "An Architecture for MPLS Implementation in Wireless Networks", Proceedings of EIT 2001, IEEE Michigan Chapter conference, Oakland University, Michigan, Jun. 2001, Retrieved Apr. 8, 2007 from http://www.secs.oakland.edu/~ganesan/network/MPLSforwirelessNetworks.pdf.

(Continued)

*Primary Examiner*—Robert W Wilson
(74) *Attorney, Agent, or Firm*—Dov Rosenfeld; Inventek

(57) ABSTRACT

Embodiments of the present invention include a method, an apparatus, and logic encoded in one or more computer-readable tangible medium to carry out a method. One method includes tagging packets and forwarding packets in a wireless mesh network using stored forwarding information for the tag, wherein the forwarding information is according to a centrally determined routing method and tag distribution method.

18 Claims, 8 Drawing Sheets

OTHER PUBLICATIONS

Vijayarangam Subramanian and S. Ganesan, "QoS Implementation For MPLS Based Wireless Networks", ASEE Conference, Apr. 2002, Oakland University, Michigan, Jun. 2001, Retrieved Apr. 8, 2007 from http://www.secs.oakland.edu/~ganesan/network/QoSImplementationForMPLSBasedwireless%20Networks.pdf.

H. Kim, K.S.D Wong, C. Wai, and L.C. Leung, "Mobility-Aware MPLS in IP-based Wireless Access Networks," in Proc. IEEE Globecom 2001, vol. 6, pp. 3444-3448, San Antonio, TX, USA, Nov. 2001.

Cisco Systems, Inc., "Tag Switching," Retrieved Apr. 18, 2007 at http://www.cisco.com/univercd/cc/td/doc/cisintwk/ito_doc/tagswtch.pdf.

W. Steven Conner, Jan Kruys, Kyeongsoo Kim, Juan Carlos Zuniga, "IEEE 802.11s Tutorial: overview of the Amendment for Wireless Local Area Mesh networking." IEEE 802 Plenary, Dallas, Nov. 13, 2006, 6:30PM.

P. Calhoun, M. Montemurro, D. Stanley, "CAPWAP Protocol Specification draft-ietf-capwap-protocol-specification-06", Internet-Draft from www.ietf.org/ietf/lid-abstracts.txt.

* cited by examiner

| Tag | Next hop | Class | Source | Destination |
|---|---|---|---|---|
| T2 | List2 | Type1 | Client 119 | 0 |
| T2' | 0 | | | |
| T3 | List2 | Type2 | Client 119 | 0 |
| T3' | 0 | | | |
| T6 | List6 | Type1 | Client 119 | Client 125 |
| T6' | 0 | | | |
| T7 | List7 | Type2 | Client 119 | Client 125 |
| T7' | 0 | | | |
| T1 | List1 | Control | 0 | 0 |
| T1' | 0 | | | |

FIG. 4

| Tag | Next hop | Class | Source | Destination |
|---|---|---|---|---|
| T2 | List2_115 | | | |
| T2' | List4_115' | | | |
| T3 | List2_115 | | | |
| T3' | List2_115' | | | |
| | | | | |
| T6 | List6_115 | | | |
| T6' | List6_115' | | | |
| T7 | List7_115 | | | |
| T7' | List7_115' | | | |
| | | | | |
| T1' | List1_115' | | | |
| T1 | List1_115 | | | |

FIG. 5

CENTRALLY CONTROLLED ROUTING WITH TAGGED PACKET FORWARDING IN A WIRELESS MESH NETWORK

FIELD OF THE INVENTION

The present disclosure relates generally to wireless mesh networks

BACKGROUND

Wireless mesh networks are becoming important. In a mesh network, routing tables can become rather large, and there is incentive to have routing be carried out at layer-2 as much as possible. For this reason, a six-address scheme is being considered for mesh networks by the IEEE 802.11 standards committee. Such a six-address scheme permits tunneling between a mesh access point and a mesh client of a mesh access point, and between two mesh clients using a single MAC header, proposed to be an IEEE 802.11s header, which is an extension of the an IEEE 802,11 MAC header. However, dealing with such 6-address methods may require new hardware that can handle such 6-address formats. There is still room for alternate methods for layer-2 routing in a wireless mesh network.

In general networks, e.g., wired networks, "label switching," also called "tag switching" is known. One example is Multi-Protocol Label Switching (MPLS). Routing can be thought of as determining the forwarding equivalence class of a packet, and then assigning a route for that forwarding equivalence class of packets. In MPLS, the assignment of a particular packet to a particular forwarding equivalence class is done once as the packet enters the network. The forwarding equivalence class to which the packet is assigned is encoded as a short fixed length value known as a "label" or "tag". Routers determine paths to a next router for each forwarding equivalent class. A label can be used to represent the route. When a packet is forwarded to its next hop, the label is sent along with it; that is, the packets are "tagged" before they are forwarded. At subsequent hops, there is no further analysis of the packet's network layer header. Rather, the label is used as an index into a table which specifies the next hop, and a new label. The old label is replaced with the new label, and the packet is forwarded to its next hop. In MPLS, Multiple routers assign different labels. As the route represented by a label is followed, when a packet arrives at some intermediate point, if the route to the ultimate destination corresponds to a previously labeled route, label switching (swapping of labels) occurs and the packet is forwarded along to the next hop of the new label in the packet. MPLS forwarding can be done by switches which are capable of doing label lookup and replacement, but need not be capable of analyzing the network layer headers.

MPLS may be difficult to apply to a wireless mesh network. When a mesh packet arrives at some intermediate point in the mesh, using a previously assigned path and the tag thereof and swapping the tag of the packet requires all intermediate points to be constantly updated of the status of all paths. The status of various links in a mesh network changes frequently, and therefore, making sure all intermediate points are updated would lead to a lot of control information being maintained at the intermediate points, and being exchanged throughout the mesh network.

Mesh networks may be centrally controlled in that each mesh point is a lightweight wireless device with much of its functionality controlled by a centralized controller. In such a mesh network, there is advantage to centralized routing compared to local distributed routing by the mesh points. For example, centralized routing can provide a route between two mesh points without having to route via the root mesh point.

BRIEF DESCRIPTION OF THE DRAWINGS

FIG. 4 shows one arrangement of a tag table in a mesh access point according to an embodiment of the present invention.

FIG. 5 shows one arrangement of a tag table in another mesh access point according to an embodiment of the present invention.

DETAILED DESCRIPTION OF EXAMPLE EMBODIMENTS

Overview

Figure 1:
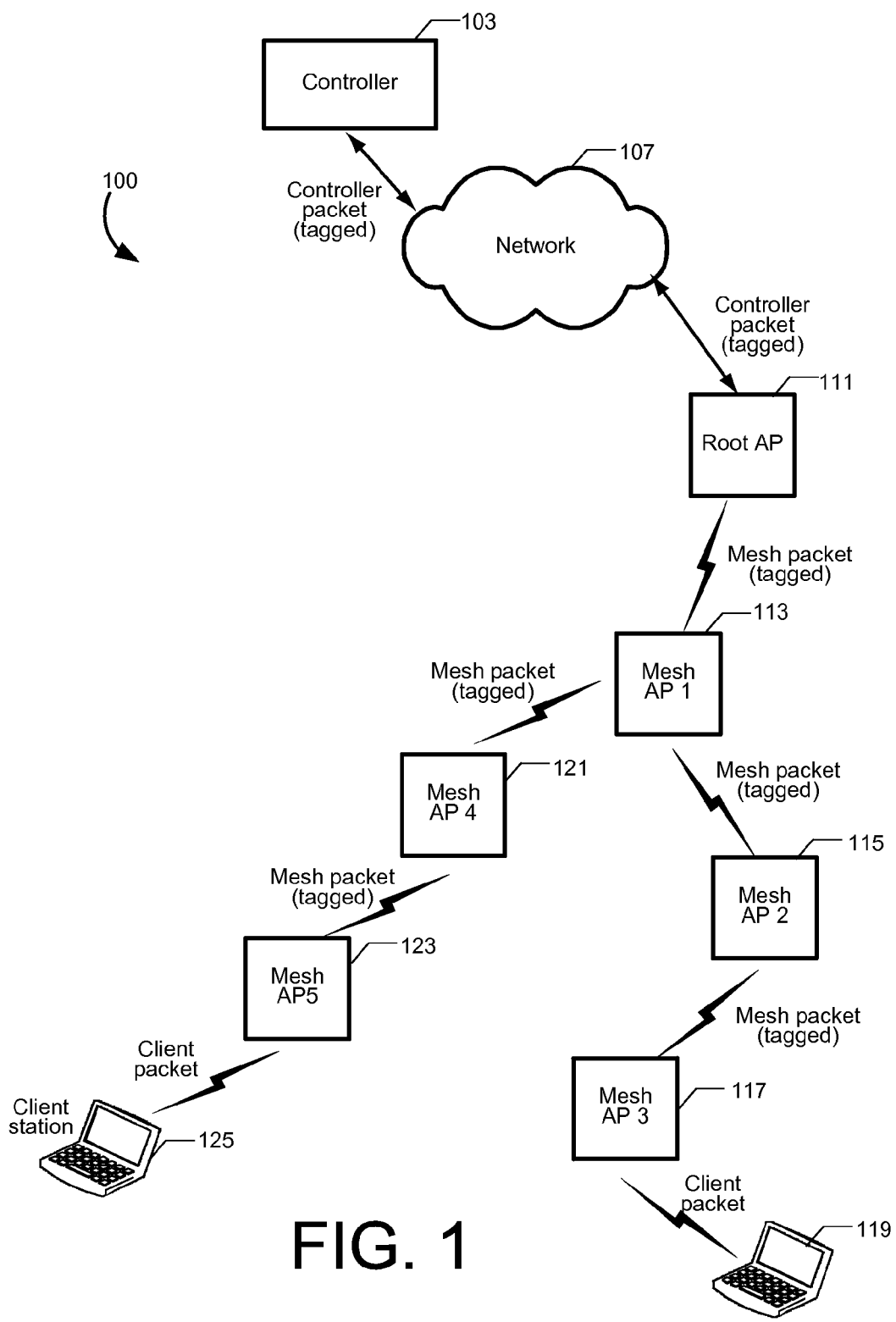
FIG. 1 shows a simple centrally controlled mesh network which includes one or more embodiments of the present invention.

Embodiments of the present invention include a method, an apparatus, and logic encoded in one or more computer-readable tangible medium to carry out a method. One embodiment of the method is to tag packets and to forward packets in a wireless mesh network using stored forwarding information for the tag, wherein the forwarding information is according to a centrally determined routing method and a tag distribution method.

One embodiment includes a method comprising receiving from each mesh point of a wireless mesh network information sufficient to determine a map of mesh points and one or more available wireless links between the mesh points. The mesh points of the wireless mesh network include a root mesh point and one or more additional mesh points. The method includes, in response to detecting that a client of a particular mesh point that has access point capabilities is joining the mesh network, using a centralized routing process to determine at least one path from the client to the root mesh point for at least one traffic class. The method further includes assigning an upstream tag to one or more determined paths for each traffic class from the client, such that each assigned upstream tag has at least one corresponding upstream path. The method includes for each upstream tag, sending to at least each mesh point in the upstream tag's one or more paths tag information on the upstream tag, such that a receiving mesh point can store forwarding information for the upstream tag, including the upstream tag of the path, and one or more immediate next hops of the receiving mesh point for the corresponding path or paths of the upstream tag. The method is configured such that a packet that has been tagged to include a tag can be forwarded by a receiving mesh point by looking up the tag in its stored forwarding information to determine the next hop for the tagged packet, and forwarding the tagged packet to the next hop.

One embodiment includes an apparatus comprising one or more processors; a memory subsystem; a network interface configured to couple the apparatus to a network to which a mesh network is connected, the mesh network including a root mesh point and one or more additional mesh points; and logic, including instructions encoded in one or more tangible media for execution and when executed, causing a control plane process to be executed. The control plane process includes receiving from each mesh point of the wireless mesh network information sufficient to determine a map of all mesh points and the available links between the mesh points, the mesh points of the wireless mesh network including a root mesh point and one or more leaf mesh points. The control plane process further includes, as a result of detecting that a client of a particular mesh point that has access point capabilities is joining the mesh network, using a centralized routing process to determine at least one path from the client to the root mesh point for at least one traffic class. The control plane process further includes assigning an upstream tag to one or more determined paths for each traffic class from the client, such that each assigned upstream tag has at least one corresponding upstream path, and for each upstream tag, sending to at least each mesh point in the upstream tag's one or more paths tag information on the upstream tag, such that a receiving mesh point can store forwarding information for the upstream tag, including the upstream tag of the path, and one or more immediate next hops of the receiving mesh point for the corresponding path or paths of the upstream tag, such that a packet that has been tagged to include a tag can be forwarded by a receiving mesh point by looking up the tag in its stored forwarding information to determine the next hop for the tagged packet, and forwarding the tagged packet to the next hop.

One embodiment includes a method comprising receiving at a first mesh point of a wireless mesh network a packet, the mesh network including a root mesh point and one or more other mesh points; ascertaining if the received packet includes a tag, and in the case that the packet includes a tag, looking up a tag data structure maintained in the first mesh point, the data structure containing tag entries each including a tag and forwarding information, each tag entry corresponding to one or more paths from a source to a destination. The method includes in the case that the looking up results in a matched tag entry that includes an indication of a next hop mesh point in the forwarding information, forwarding the packet to the next hop mesh point of the matched tag entry. The tag data structure is formed from tag information received from a central controller. The forwarding information to at least one next hop mesh points of each tag entry in the tag data structure is part of at least one path for the tag determined by the central controller using a central routing method for a traffic class, and distributed by the central controller as tag information to mesh points in the path or paths of the tag.

One embodiment includes logic encoded in one or more tangible media for execution and when executed operable to: receive at a first mesh point of a wireless mesh network a packet, the mesh network including a root mesh point and one or more other mesh points; ascertain if the received packet includes a tag, and in the case that the packet includes a tag, look up a tag data structure maintained in the first mesh point, the data structure containing tag entries each including a tag and forwarding information, each tag entry corresponding to one or more paths from a source to a destination; and in the case that the looking up results in a matched tag entry that includes an indication of a next hop mesh point in the forwarding information, forward the packet to the next hop mesh point of the matched tag entry. The tag data structure is formed from tag information received from a central controller. The forwarding information to at least one next hop mesh points of each tag entry in the tag data structure is part of at least one path for the tag determined by the central controller using a central routing method for a traffic class, and distributed by the central controller as tag information to mesh points in the path or paths of the tag.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Example Mesh Network

FIG. 1 shows a simple centrally controlled mesh network 100. A wireless mesh network includes a backhaul topology to or from a root access point 111 to a set of mesh nodes. A discovery and routing method forms a route, e.g., in the form of a tree topology between any mesh node of a set of mesh nodes, and the root mesh node. The tree topology in one embodiment is formed automatically by mesh points advertising their capabilities, and potential child mesh points receiving such advertisements and joining the mesh network. The root mesh node is coupled to a network 107, e.g., via a switch. At least some of the mesh nodes also have access point functionality so that a client may associate and communicate data to any point coupled to the network via the mesh.

In the description herein all mesh nodes of the mesh network 100 are called mesh access points (mesh APs), and may be implemented by a dual radio wireless station that includes a first radio for the backhaul link between mesh nodes, and a second radio to provide access point functionality. In embodiments that conform to the IEEE 802.11 wireless local area network (WLAN) standard, in one embodiment, the backhaul radio is an IEEE 802.11a conforming radio in the 5 GHz range, and the second radio is an IEEE 802.11g conforming radio in the 2.4 GHz range. A mesh node whose function is only as a relay point in the mesh backhaul is still called a mesh AP herein, even though it may have no AP functionality, or have its AP functionality inactive. Therefore, the terms mesh AP, mesh point, and mesh node are used interchangeably herein. Whether or not a particular mesh point has AP functionality will be clear from the context, e.g., according to whether or not that mesh point can function as an AP ay accepting and allowing client to associate with it. Note that while one embodiment of a mesh AP that has AP functionality includes two radios, in other embodiments, the same radio is used for the backhaul and for access point functionality to carry data from clients of the access point.

In a centrally controlled mesh network, the mesh nodes are "lightweight" wireless devices whose functionality is controlled by a controller 103 that is coupled to the network 107, e.g., via a switch. A protocol is used to exchange messages between any mesh node and the controller, e.g., using a secure tunnel between the mesh node and the controller 103. One such protocol was originally designed for so-called lightweight access points and is called CAPWAP (Control And Provisioning of Wireless Access Points) and is presently (April 2007) an IETF draft. See www^dot^capwap^dot^org, where "^dot^" denotes the period (".") in the actual network address. The April 2007 version (version 06) of CAPWAP is a file "draft-ietf-capwap-protocol-specification-06.txt" retrieved Apr. 18 2007 at www^dot^capwap^dot^org/draft-ietf-capwap-protocol-specification-06^dot^txt, where "^dot^" denotes the period. CAPWAP is a later version of LWAPP (Light Weight Access Point Protocol) from Cisco Systems, Inc., San Jose, CA.

The mesh APs may have AP functionality that is controlled by a controller 103 that is coupled to the network 107, e.g., via a switch. Such APs are called lightweight APs, and a protocol is used to exchange messages between any AP, e.g., mesh AP and the controller, e.g., using a secure tunnel between the mesh AP and the controller 103. One such protocol is called CAPWAP (Control And Provisioning of Wireless Access Points) and is presently (April 2007) an IETF draft. See_www^dot^capwap^dot^org, where "^dot^" denotes the period.

FIG. 1 includes the root mesh node 111, called a root AP herein, and mesh APs 113, 115, 117, 121, and 123, denoted mesh AP1, mesh AP 2, mesh AP 3, mesh AP 4 and mesh AP 5, respectively. A first client 119 is shown associated with mesh AP 117 denoted mesh AP3, and a second client 125 is shown associated with mesh AP 123, denoted mesh AP5.

The description herein assumes lightweight APs controlled by a controller via a secure CAPWAP tunnel. The description herein also assumes that the mesh APs substantially conform to the IEEE 802.11 standard in that standard IEEE frames are understood. There may be some frames and fields that are not described in the standard, hence use of the word "substantially conforming."

The description herein further assumes that all traffic to and from the mesh network passes via the controller.

While one controller is shown in FIG. 1, different embodiments of the present invention can operate with a plurality of controllers. One embodiment includes a single controller that is the "master" controller of any other controllers in that the tag routing method of assigning tags to any client via a mesh AP is carried out by the master controller. In the remainder of the description, a single controller 103 is assumed. How to modify the description to accommodate a plurality of controllers with one controller 103 being the master controller would be straightforward to one in the art, so is not discussed in detail further herein.

Centralized Routing and Tagging.

In conventional mesh networks, mesh points discover neighbors, and properties of neighbors, such as noise in the wireless signals, QoS supported, data rates supported, congestion, classes of traffic, level of subscribed service, and so forth. Routing decisions are made on a distributed basis. AWPP (Adaptive Wireless Path Protocol) from Cisco Systems, Inc. San Jose, Calif., PWRP (Predictive Wireless Routing Protocol) from Tropos Networks, of Sunnyvale, Calif., and other mesh routing protocols may be used.

In the present invention, AWPP is used by mesh APs to discover each other and to join the mesh network for the first time. AWPP also is used as the bootstrap routing method, i.e., before centralized routing improves on the route initially determined using AWPP.

In a centralized, controller based architecture such as shown in FIG. 1, the controller is able to communicate securely with each mesh AP, e.g., via a CAPWAP tunnel, and thus may be informed of the properties of each mesh AP's neighbors, and any hops between mesh points.

Embodiments of the present invention include centralized routing, e.g., by a centralized routing process at the controller 103. A centralized routing process at the controller 103 has link information of the links in the mesh network and sets up paths using the routing process, including giving newly set-up paths a short identifier—a "tag" and distributing information on the route to those mesh APs that are involved, including for each tag at least a preferred next hop. Packet forwarding includes a lookup for the tag, and forwarding the packet to the next hop. Compare this to MPLS, where each router of a plurality of routers forms routes, forms and adds labels to the route, and distributes the label information to other routers and switches. Thus, routing is distributed. Paths are re-used, so that forwarding of labeled packets includes looking up a label in a label database, finding the next hop router or switch and any associated label, and swapping the label so that the packet now has a new label, i.e., follows a path discovered at the label swapping switch or router.

Referring to FIG. 1, when a mesh AP, e.g., mesh AP 117 joins the mesh network 100, via mesh AP 115 as the parent, a centralized routing process at the controller 103 determines a control path for CAPWAP control packets between the controller 103 and the new mesh AP 117 both towards the new mesh AP 117—the downstream direction—and from the new mesh AP 117 to the controller 103—the upstream direction. Each control path—there may be separate upstream and downstream unidirectional control paths—is tagged and each mesh AP in the tagged control path—mesh APs 115, 113, root AP 111—is sent forwarding information regarding the control path including the next hop, e.g., next hop mesh AP in the upstream control path towards the controller 103, and also the next hop mesh AP in the downstream control from the controller 103, so that when forwarding tagged control packets, a mesh AP in the path includes a tag data structure that has information about tags, and need only match the tag in the packet and forward to the next hop, e.g., next hop mesh AP. In one embodiment, the control path also is marked as a default path for data traffic.

The tag data structure included in each mesh AP is in one embodiment in the form of a database, e.g., a table. The entries of the tag table include the tag, the identity of the next hop, e.g., the next mesh AP in the path, and class of traffic. The class of traffic for the control path is "control" to indicate control packets.

Some of the mesh APs in the mesh network include access point capability, and thus send beacon frames that can be received by clients. Suppose mesh AP 117 (AP 3) is such a mesh AP. When a client, e.g., client station 119 joins the mesh network the first time, including associating with such a mesh AP 117, the client 119 undergoes authentication. As a result of the authentication, the controller 103 has information on what type of client is joining, e.g., whether a voice client, or a data client, and what level of service the client has subscribed. From this information, and from information about the links between mesh APs in the mesh network, the controller 103 determines a path or paths for each class of traffic for client data to and from the new client, where the "class" is defined by the type of client traffic, the level of subscribed traffic, and so forth. Depending on the class of traffic, unidirectional paths for each of the upstream and downstream directions, or a bidirectional path, or both unidirectional and bidirectional paths are determined. Each such path is given a tag, and a control packet with path information is sent first to each intermediate mesh point in each path, and then to the mesh AP that the client is associated with. Such information is used to populate the tag database at each mesh AP in the network. The entries of the tag table include the tag, the identity of the next hop, e.g., the next mesh AP in the path, and the class of traffic, e.g., as defined by the type of client traffic and level of subscribed service. Thus, a path is set up for the client from the client's mesh AP to the controller 103, and every mesh point in the path can forward a tagged packet to the next point in the path simply by matching tag information carried in the tagged packet.

The centralized routing process in the controller 103 for determining paths uses information at the controller 103 including the graph of all mesh points in the mesh, and information on the links between mesh points. The link information is provided to, or determined from information sent to the controller 103 at the time a new mesh AP joins the mesh network, based on neighbor advertisements sent by potential parent mesh APs to a potential child mesh AP attempting to join the mesh network. When the mesh AP joins the mesh network, the new child mesh AP in one embodiment, sends to the controller 103 information on its link to the parent, such that the controller can determine or receive link characteristics including, but not limited to, one or more of data rates, noise level, quality of service (QoS), class of service (CoS), time delays, and so forth, and, in this manner, the controller 103 can centrally compute paths for different classes of traffic.

Thus two types of tagged paths are determined: control paths for control packets, and data paths for different classes of data. As described below, tagged paths for multicast class or classes of traffic also may be defined, with each multicast path defining a tree from the root AP to each mesh AP of clients in the multicast group. These control and data paths need not be the same. Furthermore, control paths are set up and tagged as the controller discovers new mesh APs in the mesh network, while data path and tags for the data paths are formed as new clients of mesh APs are authenticated, such data paths and tags being formed for the different classes of traffic for the client.

Data Plane and Control Plane Processes

The functionality of network devices are often conveniently and conventionally divided between what are time critical tasks such as removing headers from different data units such as frames and packets, parsing content, determining addresses, forming and adding headers to different data units such as frames and packets, forming packets, encrypting packets, queuing packets for sending, sending or dropping a packet, and so forth, and less time critical, but often more complex tasks, such as device management, classifying packets for different queues according to one or more criteria, access control, traffic shaping, Quality of Service (QoS) and Class of Service (COS) assignment so that packets are more or less efficiently processed in subsequent network components, and so forth. The fast path, also known as the data path, data plane path, or forwarding path, performs operations on all packets and must perform at the rates that packets arrive. The slow path, also known as the control path or exception processor, performs operations on a small percentage of packets. Although slow path operations can be much more complex, the significantly lower rate is manageable by a relatively less speedy processor, such as an off-the-shelf microprocessor.

In the description herein, core time-critical paths are described to be processed in what is called the "data plane" and less time-critical, but often more complex tasks are described to be processed in what is called the "control plane." Each device, e.g., controller, mesh node such as a mesh AP, root mesh node such as a root AP, etc., is described herein as having data plane and control plane functionality and tasks. Although such division is common, the invention is not restricted by including such a partitioning of tasks, and no implications should be drawn, for example, that what are described as control plane tasks, and what are described as data plane tasks are performed by different processors or processing systems.

Figure 2A:
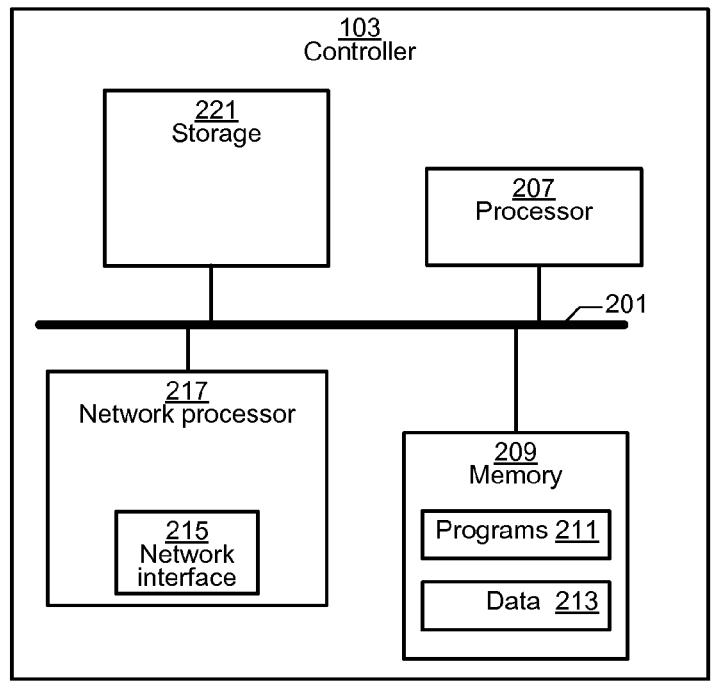
FIG. 2A shows a simplified block diagram of one embodiment of a controller.

FIG. 2A shows a simplified block diagram of one embodiment of the controller 103. The controller includes a bus structure shown in simplified form as a single bus, a processor, e.g., general purpose processor 207, a storage subsystem 221, a memory subsystem 209 and a network processor 217. The network processor 217 includes a network interface 215 that serves as the network interface for both the control plane and the data plane processes, and special purpose hardware, including memory for special purpose network instructions. The network processor 217 is configured to implement the data plane process of the controller 103. The memory 209 is shown to include programs 211 including the programs needed to implement the control plane process of the controller 103 described herein. The memory subsystem 209 also includes data 213 that includes the data structures maintained in the controller as described herein. Note that those in the art will understand that not all of the programs and not all of the data structures may be in memory at all times, an that some of this may be in the data storage subsystem 221.

Figure 2B:
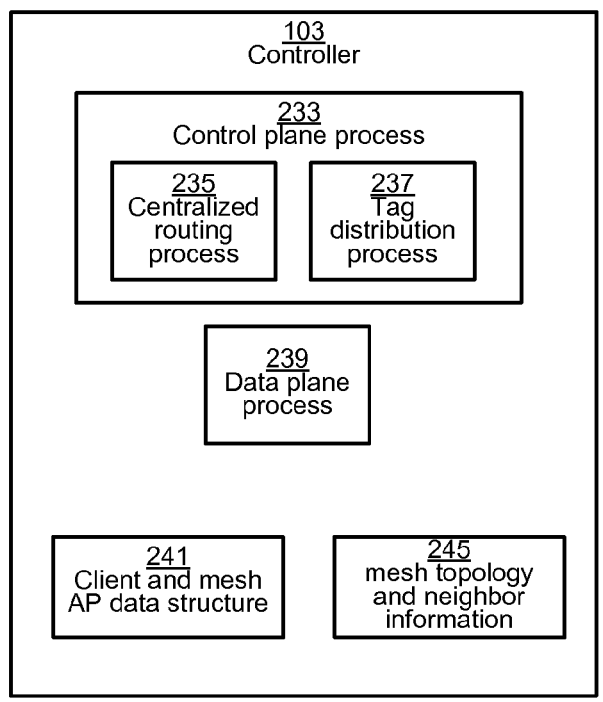
FIG. 2B shows a simplified functional diagram of one embodiment of the controller implemented by the block diagram shown in FIG. 2A.

FIG. 2B shows a simplified functional diagram of one embodiment of the controller 103 as implemented by the block diagram shown in FIG. 2A. The controller 103 functionally includes a control plane process 233 and a data plane process 239. The memory subsystem 209 maintains a client and mesh AP data structure 241 that is arranged to store information on the mesh APs and on what clients are associated with each mesh AP, and one or more of their characteristics, and a mesh topology and neighbor data structure 245 that maintains information on the graph of the mesh network, on neighbor information and/or link information from which the controller can determine link information about the mesh network's links.

The control plane process 233 includes the centralized routing process 235 and the tag distribution process 237. While the embodiment shown includes a separate routing process and tag distribution process, in other embodiments, these functions are not so partitioned into separate processes. Furthermore, those in the art will understand that typically, the control plane processes are carried out by one or general purpose processors that can carry out relatively complex operations, and the data plane process is carried out by one or more special purpose processors designed to carry out packet forwarding at a relatively fast rate the invention does not depend on such partitioning. For example, all processes may be carried out by one or more general purpose processors, and in an alternate arrangement, there may be special hardware for some of the functions of the control plane process 233.

The control plane process 233 is configured to carry out determining routes in the mesh network, assigning tags as needed, distributing tags to involved mesh APs, and deleting tags as required.

Figure 3A:
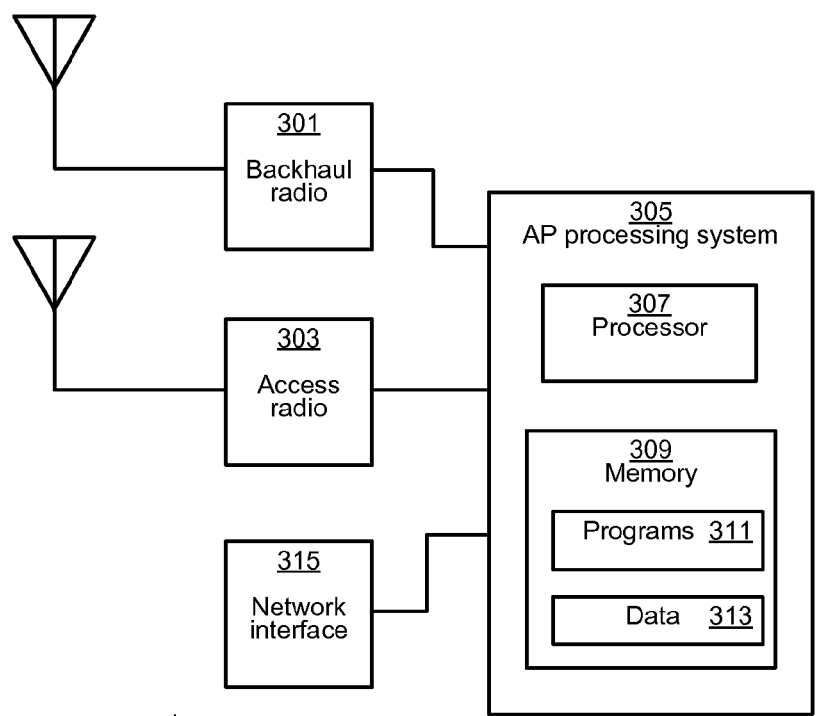
FIG. 3A shows a simplified block diagram of one embodiment of a mesh access point.

FIG. 3A shows a simplified block diagram of one embodiment of a mesh AP that includes two radios, a first radio 301 for the backhaul that is used, for example, as a CAPWAP tunnel to the controller 103 and for mesh data, and a second radio 303 that is used as an access radio for data communication with clients associated with the mesh AP. One embodiment of the mesh AP 117 includes a network interface that enables the mesh AP to be coupled to a wired network, such that the mesh AP also can act as a root AP. The radios 301 and 303 and network interface 315 are coupled to an AP processing system 305 that includes a processor 307 and a memory subsystem 309. The memory subsystem includes programming instructions that when executed by the processor implement the control plane and data plane mesh AP processes described herein. The memory 309 also includes programs 311 and data 313 that includes the data structures such as the tag database and the client databases described herein.

Those in the art will understand that while the architecture of FIG. 3A shows a separate access radio 303 and a separate backhaul radio 301 for the backhaul links of the network, each able to operate simultaneously at different frequency bands, in an alternate embodiment, the same radio is used for access and backhaul communication.

One embodiment of the mesh network operates substantially in conformance to the IEEE 802.11 standard, and in one embodiment of the mesh AP, e.g., mesh AP 117, the backhaul radio 301 substantially conforms to the IEEE 802.11a standard, operating in the 5 GHz band, while the access radio 303 substantially conforms to the IEEE 802.11g standard, operating in the 2.4 GHz band.

Figure 3B:
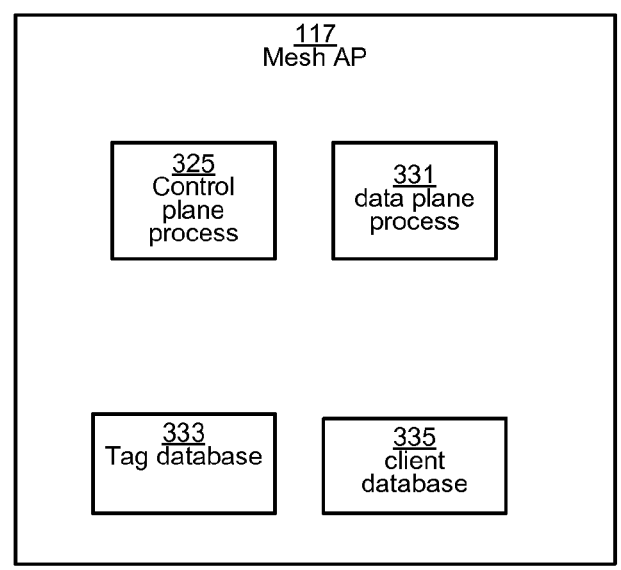
FIG. 3B shows a simplified functional diagram of one embodiment of the mesh access point implemented by the block diagram shown in FIG. 3A.

FIG. 3B shows a simplified functional block diagram of a mesh AP such as mesh AP 117 as implemented by the mesh AP shown in FIG. 3A. In one embodiment, the functionality of the mesh AP is partitioned into a control plane process 325 and a data plane process 331. The mesh AP 117 includes the tag database 333 and a client database 335 of associated client devices. The control plane process 325 functions include receiving tag information, sending information to the controller on attached clients and on the link to the parent mesh AP when joining a mesh network, and informing the controller's control plane process 325 of broken links. The data plane functions include examining tag information in packets, forming headers for packets from client devices, deleting headers of packets to clients of the mesh AP 117, looking up the tag database 333, and forwarding packets.

Figure 7:
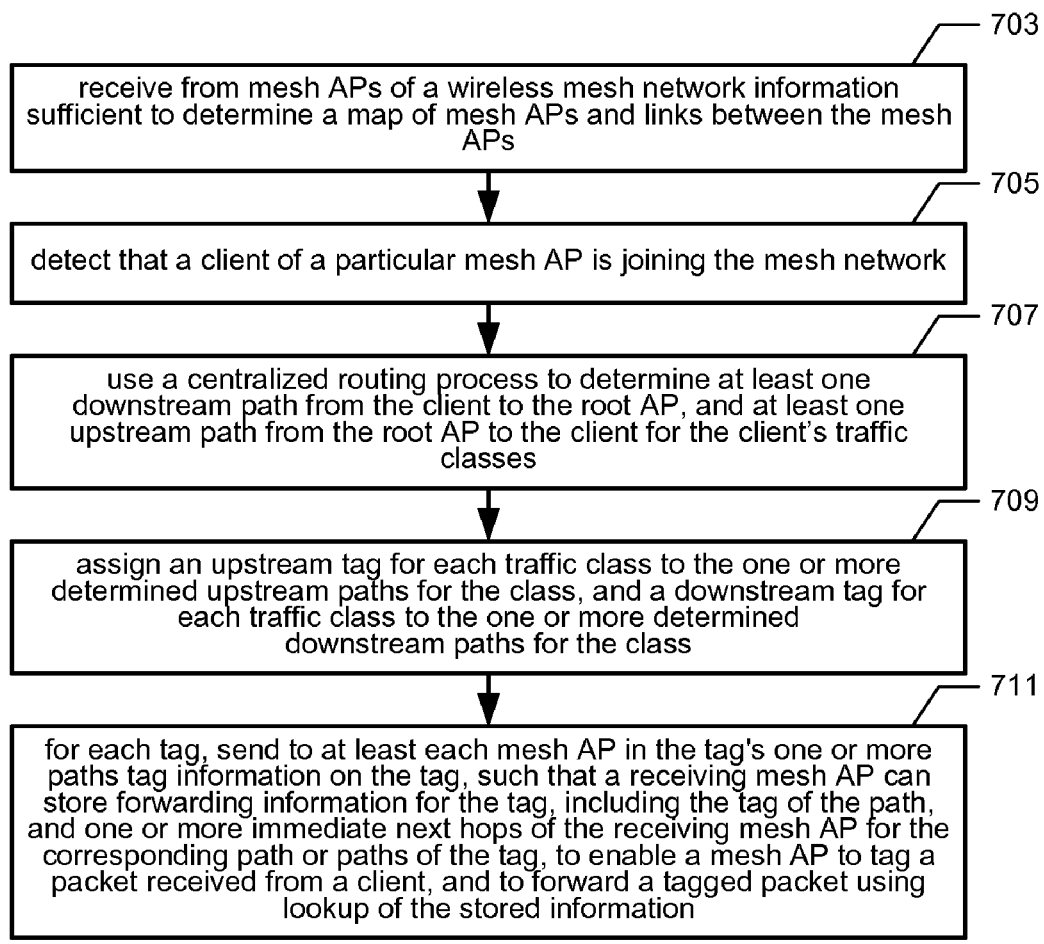
FIG. 7 shows a flow chart that summarizes one embodiment of a method in a central controller.

FIG. 7 summarizes by a flow chart of one method embodiment of the invention carried out in the controller. The method includes in 703 receiving from mesh APs of a wireless mesh network information sufficient to determine a map of mesh APs and links between the mesh APs. The method includes in 705 detecting that a client of a particular mesh AP is joining the mesh network, and as a result in 707 using a centralized routing process to determine at least one downstream path from the client to the root AP, and at least one upstream path from the root AP to the client for the client's traffic classes. In 709, the method includes assigning a downstream tag for each traffic class to the one or more determined downstream paths for the class, and a, upstream tag for each traffic class to the one or more determined upstream paths for the class. The method includes in 711 for each tag, sending to at least each mesh AP in the tag's one or more paths tag information on the tag, such that a receiving mesh AP can store forwarding information for the tag, including the tag of the path, and one or more immediate next hops of the receiving mesh AP for the corresponding path or paths of the tag, to enable a mesh AP to tag a packet received from a client, and to forward a tagged packet using lookup of the stored information.

Tag Formation

FIG. 4 shows one arrangement of the tag table 333 of a mesh AP, in this case, mesh AP 117, and FIG. 5 shows one arrangement of the tag table 500 of an intermediate mesh AP, in this example, mesh AP 115 that is the parent of mesh AP 117. The tag table includes entries that each include at least the tag, that is, a small number of bits that identify the tag, the class of packets the tag is for, e.g., control, or one of a set of traffic classes, e.g., voice, multimedia, data, priority data, etc., e.g., with level of subscribed service, or one of set of multicast traffic classes. Each tag entry also includes at least one next hop entry.

In one embodiment, the centralized routing process 235 is able to determine more than one route, with one route being the primary route, and the other paths being redundant, secondary routes to use in the case that the first route fails. One embodiment of the invention includes for each entry a list, or in an alternate embodiment, a pointer to a list of at least one next hop arranged in priority order. The primary next hop is the highest priority next hop, and when more than one path is determined for a tag, there may be more entries in the list. This provides a level of redundancy. If one path is not available, the next priority next hop is used, and the control plane process of the controller is sent information on the broken next hop.

When the mesh AP 117 first joins the mesh network and the controller 103, the controller's control plane process 233 determines a control path for CAPWAP control packets, and assigns a tag, in this example denoted T1, for the control path route in the upstream direction, and another tag, denoted T1' herein for the control path router in the downstream direction. The tag distribution process 237 of the control plane process 233 sends the path information for the tags T1 and T1', including the tags to all intermediate mesh APs in the path, in particular, referring to FIG. 1, to root AP 111 and mesh APs 113, and 115, and then sends the tags to the newly joined mesh AP 117.

Each intermediate mesh point adds an entry in its tag table for each direction of the control path, i.e., an entry for the upstream direction tag T1 towards the controller 103 and an entry in the downstream direction tag T1' away from the controller. The leaf mesh point of the path, in this case mesh point 117 adds a an entry for the upstream direction tag T1, and also an entry for the downstream direction, but with the next hop in the downstream direction a null entry (0).

Considering first mesh AP 117, the control plane process 325 of mesh AP 117 receives the tag information for the tags T1 and T1' and enters these as entries 401 and 401' in the tag table 333. The upstream tag is the tag T1, and the class of tag is an identifier, denoted Control in FIG. 4. List1 denotes the list of next hops, and in this example, list 1 has as its only entry mesh AP 115. All other fields in the entry 401 are set to a default value, e.g., 0. In the downstream direction, the list of next hops is a null entry, indicated as 0, to indicate that the mesh AP 117 is the destination mesh AP—there is no next hop.

Consider now an intermediate mesh AP, e.g., mesh AP 115. Referring to FIG. 5, the control plane process of mesh AP 115 receives the tag information for the tags T1 and T1' and enters it entries 501 and 501' in the tag table 500. The next hop for tag T1 in this example, denotes List1_115, is mesh point 113, and the next hop entry, denoted as List1_115' for this Tag T1' includes mesh AP 117.

In one embodiment, entries for data traffic are only added as data clients join the network by associating with one or another of the mesh APs. As an example, suppose client 119 associates with mesh AP 117 and authenticates with an authentication server (not shown) coupled to the controller 103. As a result of the authentication, the control plane process 233 of the controller 103 adds client information to its client and mesh AP data structure 241, including the type of client, the class of service, and what classes of traffic this client 119 is authenticated for, including the level of service subscribed by the client. For each class of service and level of service, and for each direction, the centralized routing process 235 of the controller determines one or more paths for packets to follow. As a result, a tag is assigned to each class and subscribed level of service and a priority ordered list of routes is assigned to each such tag. In one embodiment, the prioritized list of routes are first for the level of service subscribed for, and as backup, for lesser levels in case there is a break in the higher level of service subscribed for.

Once the paths are tagged as a result of the client 119 associating with the mesh AP 117, for each tagged path, the tag distribution process sends control packets to each mesh AP in the tagged path so that the mesh APs can update their tag tables with new tag entries. In particular, the intermediate mesh APs, in this example the root AP 111 and mesh APs 113 and 115 are first sent the tag information, and then the mesh AP of the client, in this case mesh AP 117, is sent the tag information. At each receiving mesh AP, the control plane process of the mesh AP receives the tag information and forms entries in the tag database for the tagged paths.

As an example, suppose client 119 is a client that has two classes of traffic, denoted Type1 and Type2, and the upstream paths are tagged with tags denoted T2 and T3 for the Type1 and Type2 traffic classes, respectively, while the downstream paths are tagged with tags denoted T2' and T3' for the Type1 and Type2 traffic, respectively. Referring first to FIG. 4, for mesh AP 117, after the tag information is received by the control plane process 325 and entries placed in the control tag table 333, the control the tag table 333 includes entries 402 and 403 for upstream tags T2 and T3, respectively, and entries 402' and 403' for downstream tags T2' and T3', respectively. List2 and List 3 in the next hop fields of entries 402 and 403 denote the priority ordered lists of next hop mesh APs for the Type1 and Type2 class paths, respectively. The upstream next hop fields have null entries to indicate that these are the ending mesh APs for these tagged paths. Each non-null next hop entry also includes a Source field for the source address, in this case client 119, and a destination address field used for destination addresses that are within the mesh network for intra-mesh paths. In this case, the destination address field of the upstream tag entries 402 and 403 has 0 to indicate that this path is to the controller.

Consider now mesh AP 115's tag table shown in FIG. 5. After the tag information is received by the control plane process and entries are placed in the control tag table, the control tag table includes entries 502 and 503 for tags T2 and T3, respectively for the Type1 and Typ2 tags in the upstream direction, and entries 502' and 503' for tags T2' and T3', respectively for the Type1 and Type2 tags in the down stream direction. List2_115 and List3_115 in the next hop fields denote the priority ordered lists of upstream next hop mesh APs for the Type1 and Type2 class paths, respectively, and for example, would include mesh AP 113. Similarly, List2_115' and List3_115' in the next hop fields denote the priority ordered lists of downstream next hop mesh APs for the Type1 and Type2 class paths, respectively, and for example, would include mesh AP 117.

The other entries shown in FIGS. 4 and 5 are for intra-mesh paths. Such intra-mesh AP paths are formed as a result of a packet being routed from a first client of a first mesh AP in the mesh network to a second client of a second mesh AP of the mesh network. Their formation is described in more detail herein below.

Data Plane Processing

Data plane processing is now described by way of an example of a packet from the client 119. For purpose of illustration, assume that no intra-mesh tags exist in mesh AP 117's tag table 333 for this client 119.

The functions of data plane processing include adding tags or headers to packets at appropriate points in a path, e.g., at the AP of a client, at the root AP, and at the controller; removing tags or headers from packets at appropriate points in a path, and forwarding packets. Data plane processing further includes communicating with the control plane processing as appropriate, e.g., to inform of a broken link, to communicate of success, and so forth.

Figure 6A:
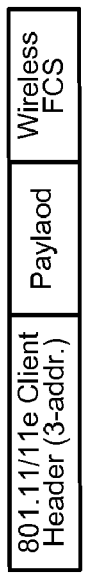
FIG. 6A shows a typical client packet received by a mesh from a client.
Figure 6B:
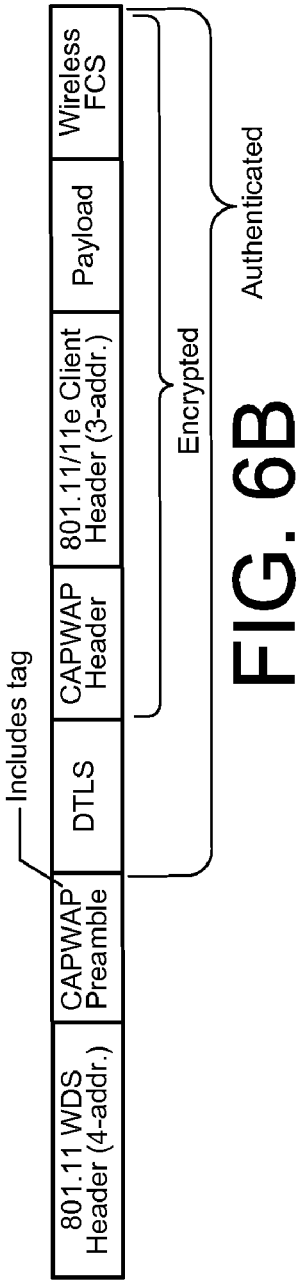
FIG. 6B shows a typical tagged mesh packet according to one embodiment of the invention.
Figure 6C:
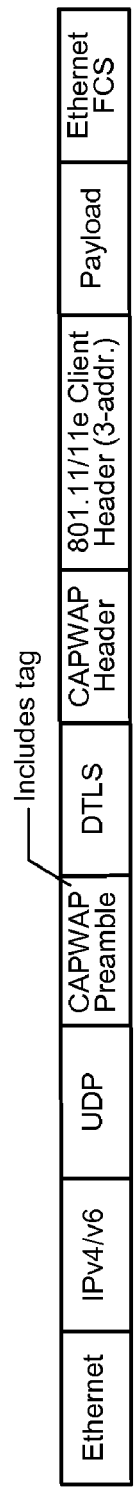
FIG. 6C shows a typical tagged control packet according to one embodiment of the invention.

Referring again to FIG. 1, different forms of packets are used depending on where the traffic is in the network. FIGS. 6A, 6B, and 6C show different packet formats used in one embodiment of the invention. Note that the invention is not limited to these particular packet formats, and may be used with other packet formats.

Consider, for example the client 119 sending a packet via its mesh AP 117. FIG. 6A shows a client packet format assuming an 802.11 implementation. The client packet includes a 3-address IEEE 802.11e client header, the payload, and a wireless frame control sequence (FCS field). In order to illustrate both upstream and downstream data plane processing, suppose the client packet is addressed to another client, client 125 (see FIG. 1) within the mesh network. Suppose no intra-mesh tagged path has yet been formed for such traffic, so that the path will include an upstream path from the client 119 to the controller 103, and a downstream path from the controller 103 to the other client 125. Note that the upstream part of the data plane processing for this first example would be the same if this was traffic to outside the mesh, and the downstream part of the data plane processing for this first example would be the same if this were traffic from outside the mesh to the client 125.

The Upstream Path from the Client to the Controller

FIG. 6A shows a typical client packet received by the mesh AP 117 from the client 119. Suppose this is a packet for the Type1 class of traffic. The client data may be encrypted, in which case the data plane process 331 of the mesh AP 117 includes decrypting the data. The data plane process 331 of the mesh AP 117 further includes looking up the tag database 333 (see FIG. 4) to ascertain that a path exists for the class of traffic. In one embodiment, the search of the tag database is for three fields, the source field so that a tag for data traffic for this client is located, the destination field to ascertain whether there is a tagged path with the destination packet's destination, indicating an intra-mesh path, and the class to ensure that the tagged path is for the class of traffic. In this example, assume first that there is not yet a tagged intra-mesh path between the mesh APs 117 and 123 of the source and destination clients. The search then is for a path for the class of traffic with the source being the client 119. The class is Type1 for this example, and the tagged path 402 is found that has a next hop list denoted List2 of next hop mesh APs, and that matches the source—client 119, and class of traffic—Type1. A 0 in the destination field indicates that this path is to the controller 103. Note that in one embodiment, in the case that no match is found for the class of traffic, a default path—the control path with tag table entry 401—is used.

If no tag entry is found, the data plane process informs the control plane process 325 of the mesh AP 117. In one embodiment, the packet is discarded, and in another embodiment, the packet is sent to the controller using traditional routing.

In the case the tag entry is found, in this example for the tag denoted T2, the mesh AP's data plane process 331 includes tagging the packet. The April 2007 version (version 06) of CAPWAP includes CAPWAP information in a CAPWAP header that is included as part of the packet that is encrypted and authenticated, and a CAPWAP preamble that is not encrypted. In one embodiment if the present invention, the tag for the packet is added as a field in the CAPWAP preamble.

The data plane processor 331 in the mesh AP 117 includes forming the CAPWAP header for the controller 103 and prepends the formed CAPWAP header to the packet payload.

One embodiment includes adding an optional DTLS header and encrypting the packet. Those in the art will be familiar with Datagram TLS (DTLS) as a protocol based on TLS—the standard protocol used for securing TCP based Internet traffic—that is capable of securing datagram transport such as UDP (User Datagram Protocol) and that is well suited for tunneling applications, e.g., the CAPWAP tunnel to the controller in a mesh network. Those in the art also will understand that in traversing the mesh network, two types of encryption are possible: optional hop-by-hop encryption that may happen between two mesh APs as defined by the 802.11i standard, and end-to-end DTLS encryption. Such DTLS encryption is mandated by the CAPWAP standard for CAPWAP control packets, and is an option for CAPWAP data. In this example, the packet is a data packet, so that the DTLS encryption is optional, e.g., set up by a system administrator.

Note that since the intermediate mesh APs do not participate in the end-to-end CAPWAP protocol, such intermediate mesh APs will not be aware and capable of processing DTLS/CAPWAP frames. However, intermediate mesh APs can be setup by a system administrator to encrypt all traffic, including hop-by-hop mesh traffic, as well as client traffic, using in the case of IEEE 802.11, AES (Advanced Encryption Standard) encryption per the IEEE 802.11i standard.

Thus, the end mesh AP 117 in the upstream towards the controller in addition to decrypting the client traffic, may include two encryptions: TDLS CAPWAP encryption of the CAPWAP packets, and optional hop-by-hop encryption of the traffic.

The data plane process includes forming a CAPWAP preamble that includes the tag T2 from the tag table 333 and prepends the CAPWAP preamble to the DTLS encrypted packet. The data plane process 331 includes forming an 802.11 header, in this example embodiment, a 4-address IEEE 802.11 WDS header with the receiver address (RA) being the highest priority of the list of next hops, in this case mesh AP 115, with the transmitter address itself (mesh AP 117), and prepends the IEEE 802.11 WDS header to the tagged packet. The data plane process 331 includes, in the case the mesh network is set up for hop-by-hop encryption, encrypting the packet. The data plane process further includes forwarding the packet to the next mesh AP 115.

FIG. 6B shows the resulting mesh packet that is forwarded to the next mesh AP in the tagged path of tag T2—mesh AP 115.

In the data plane process, each intermediate mesh AP (in this example, mesh APs 115 and 113, and the root AP 111) includes in the case that the mesh network is set up for hop-by-hop encryption, decrypting the packet received. Each mesh AP that includes AP functionality includes a client data structure, e.g., a client database such as a client table—see client database 335 in FIG. 3B for mesh AP 117. In the case that the mesh AP has AP functionality, the data plane process includes looking up the destination address (DA) of an arriving packet in its client table. As a result of the client look up, if the DA is not a client address as is the case for this example, the data plane process of the mesh AP, in this case of mesh AP 115 includes looking up the tag database of mesh AP 115 (see FIG. 5) for the T2 obtained from the CAPWAP preamble. In this example, tag T2's entry 502 is found, and the next hop list, in this case the list List2_115 that includes only mesh AP 113 is retrieved. In the case that the mesh network is set up for hop-by-hop encryption, the mesh AP's data plane process includes encrypting the packet. The data plane process includes forwarding the tagged packet, e.g., by updating the 802.11 header receiver address RA=downlink adjacency (mesh AP 113); TA=itself (mesh AP 115). In the case of mesh AP 113, the next hop is the root AP 111.

At the root AP 111, the packet optionally is decrypted, and the next hop is looked up by tag matching. In this case, when the tag is matched, the next hop list from the root AP's tag database indicates that the next hop is the controller. The data plane process of the root AP 111 includes replacing the IEEE 802.11 header with the appropriate IP/UDP/Ethernet transport headers, prepending such headers, and sending the resulting packet—a controller packet—to the controller 103 via the network 107.

FIG. 6C shows an example of a tagged controller packet as sent to the controller 103, according to an example embodiment of the invention.

At the controller, the data plane process 239 at the controller 103 includes processing and removing the 4-address 801.11 WDS header, processing and removing the tag in the CAPWAP preamble, and in the case data packets are set up with DTLS encryption, decrypting the packet using DTLS, and re-assembling the packet using a CAPWAP re-assembly scheme.

Note that in an alternate embodiment, the root AP includes fast and powerful data plane processing capabilities, and is able to carry out the DTLS decrypting and re-routing that is described herein as occurring at the controller 103.

The controller receiving traffic for a destination can look at layer-2 and higher-layer information and make a determination as to how to forward the payload according to the traffic, e.g., to map into a downstream tag.

In this example, the destination address is client 125.

The Upstream Path from the Controller to the Client Station

At the controller 103, the data plane processor 239 ascertains the destination address—client 125—and looks up its client and mesh AP table from which it determines that the destination client 125 is a client of mesh AP 123 within the mesh. The data plane process 239 queries the tag distribution process 237 at the control plane process 233 to search for a tag with mesh AP 123 as a destination and with Type1 as the class of traffic. At the control plane process 233, the controller provides the control plane with the tag to use. For example, the controller forms a tagged path if none yet exists, or fetches the tag if a path already exists.

Note that in addition to so providing the data plane with the tag to use for reaching the mesh AP 123 of the destination client 125, in one embodiment, in the control plane process, the controller ascertains whether or not this is an intra-mesh packet, and determines at least one intra-mesh path and tag for traffic between client 119 and client 125 of this Type1 class. The so-formed intra-mesh tags and paths are then distributed by the tag distribution process 237 to the appropriate intermediate mesh APs, including the root mesh AP, and then, to the endpoint mesh APs 123 and 117. See herein below for more on intra-mesh routing.

Returning to the data plane processing at the controller, the data plane processor 239 forms a CAPWAP header for the client and prepends it to the payload for the packet. The method includes prepending (adding) the formed CAPWAP header. In the case that the data is set up for DTLS encrypting of the packet, the process includes adding a DTLS header and encrypting the packet using end-to-end encryption for CAPWAP messages to the mesh AP 123 of the mesh network. Note that in alternate embodiments, wherein the root mesh AP includes fast data plane processing, the encryption may be carried out at the root AP. In the description herein, the controller 103 is assumed to carry out such data plane processing.

The data plane process 239 at the controller includes adding the tag to the CAPWAP preamble, and further includes forming an 802.11 header. In one embodiment, the header is a 4-address 802.11 WDS header with no receiver address (RA) and transmitter address (TA) in it and prepending the 802.11 header to the tagged frame. The data plane process 239 adds the IP/UDP/Ethernet transport headers before sending the packet out to the root AP 111.

At the root AP 111, at the intermediate mesh AP 121 and at the mesh AP 123 of the client 125, assume that the respective control plane processes of these mesh APs has received tag information from the controller about the Type1 class tag to the client, so that each mesh AP's respective tag database for the path of the tag has an entry for the tag.

The root AP 111's data plane process includes removing the outer Ethernet, IP, and UDP headers.

As in the upstream direction, each intermediate mesh AP that includes AP functionality includes as part of its data plane process looking up the destination address in its client table to ascertain if the destination is one of its clients. In this example, the DA is not of a client of the root AP 111. The data plane process of the mesh AP, in this case of the root AP 111, includes looking up the tag in the CAPWAP preamble, and finding the downlink adjacency list for the tag in its tag table, and, in the case hop-by-hop encryption is set up, encrypting the packet. The data plane process forwards the packet, e.g., by updating the 802.11 header receiver address RA=downlink adjacency (mesh AP 121); TA=itself (root mesh node).

The intermediate mesh APs' data plane process—in this example, the data plane process of mesh AP 121 includes in the case that hop-by-hop encryption is set up, decrypting the packet, and looking up the tag in the CAPWAP preamble, and finding the downlink adjacency list for the tag in its tag table, in the case that hop-by-hop encryption is set up, encrypting the packet, and forwarding the packet, e.g., by updating the 802.11 header receiver address RA=downlink adjacency (mesh AP 123); TA=itself (mesh AP 123).

At the mesh AP 123 that includes AP functionality, the data plane process 331 in the case that hop-by-hop encryption is set up, includes decrypting the packet. After the hop-by-hop decryption in one tag based embodiment, a tag lookup should be sufficient to determine whether this mesh AP is the destination and there is no next hop. A client lookup should not be necessary to determine if the AP is the destination mesh AP. However, one alternate embodiment includes looking up the destination address, in this case of client 125 in its client table, and ascertaining that client 125 is a client. The data plane processing includes removing the CAPWAP preamble with the tag, translating the 4-address dot11 header (WDS) to a 3-address format (BSS), decrypting using the DTLS header, removing the CAPWAP header, optionally carrying out client IEEE 802.11i encryption, and transmitting the packet over the air to the client 125.

Note that in the downstream direction, the last mesh AP, mesh AP 123 to which the destination client 125 is associated performs two decryptions and one encryption in a CAPWAP based mesh architecture for traffic to the client 125: one 802.11 decryption of intra-mesh traffic that came from the neighbor, in this example, mesh AP 121, one CAPWAP DTLS decryption, and the final 802.11 encryption for traffic to the client 125 that came in the CAPWAP frame.

Figure 8:
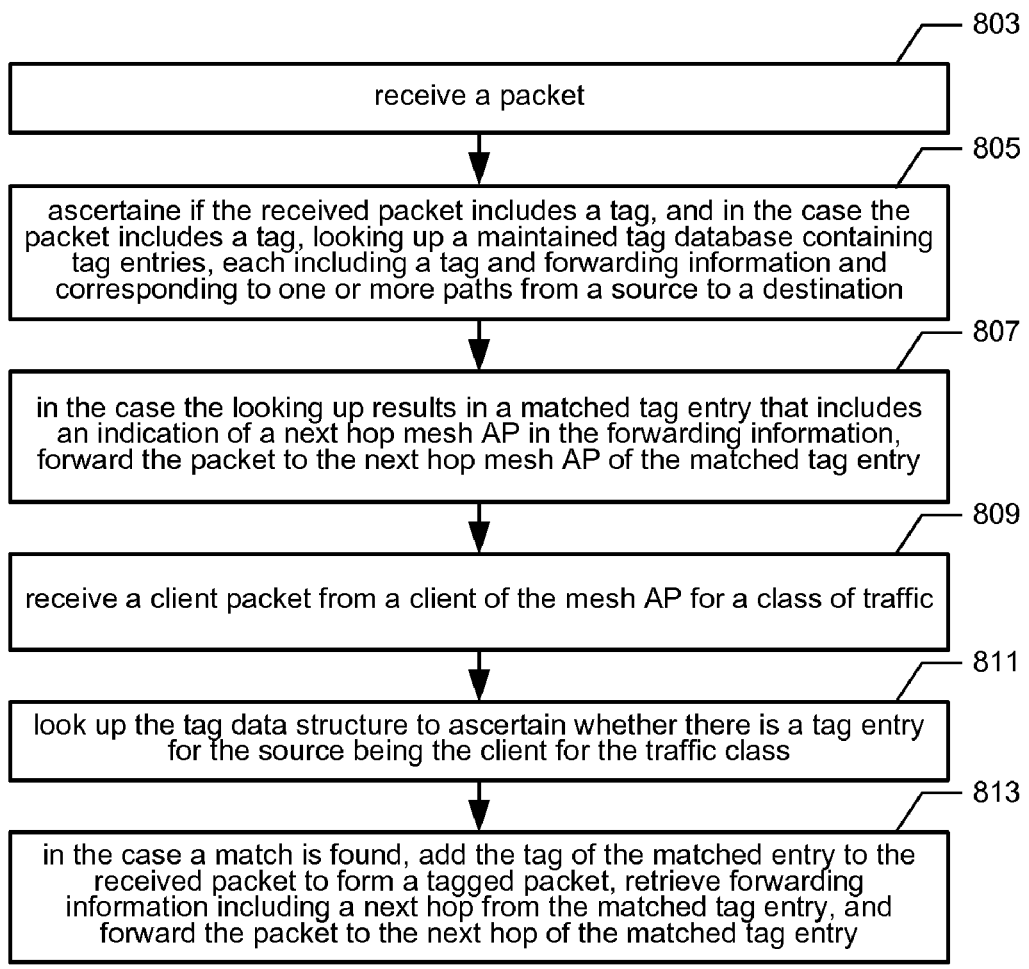
FIG. 8 shows a flow chart that summarizes one embodiment of a method in a mesh AP.

FIG. 8 shows a flow chart and summarizes one embodiment of a method in a mesh AP. The method includes in 803 the mesh AP receiving a packet, and in 805 ascertaining if the received packet includes a tag, and in the case that the packet includes a tag, looking up a tag database maintained in the mesh AP. The database, as described herein, contains tag entries each including a tag and forwarding information, and each corresponding to one or more paths from a source to a destination. As described herein, the tag database is formed from tag information received by the mesh AP from a central controller. The forwarding information to at least one next hop mesh points of each tag entry in the tag data structure is part of at least one path for the tag determined by the central controller using a central routing method for a traffic class, and distributed by the central controller as tag information to mesh points in the path or paths of the tag. The method includes in 807, in the case that the looking up results in a matched tag entry that includes an indication of a next hop mesh point in the forwarding information, forwarding the packet to the next hop mesh point of the matched tag entry.

Also shown in FIG. 8 is the mesh AP in 809 receiving a client packet from a client of the mesh AP for a class of traffic. In 811, the method includes looking up the tag database to ascertain whether there is a tag entry for the source being the client for the traffic class. In 813, the method includes, in the case that a match is found, adding the tag of the matched entry to the received packet to form a tagged packet, retrieving forwarding information including a next hop from the matched tag entry, and forwarding the packet to the next hop of the matched tag entry Multicast Data Plane Processing Embodiments of the present invention further include support for multicast traffic. In the case of multicast, traffic from the root AP is directed towards clients of a tree of mesh APs. In the control plane, the control plane process 233 of the controller determines each multicast tree as a result of the controller 103 snooping client requests to join a multicast stream. For example, in embodiments using the CAPWAP standard, an AP to which a requesting client is associated snoops a join request from the client and joins the multicast tree on behalf of the client. How to modify for non-CAPWAP protocol architectures would be clear, and depends on the architecture.

For multicast, a tag is associated with a group of multicast streams; multicast streams that share a tag will have some common characteristics such as one or more of bandwidth (high or low) of the streams, security requirements of the streams (highly secured or public announcement), and/or latency sensitiveness (push-to-talk or file download).

Thus multicast tags are formed, of different multicast tags classes, and pushed to each mesh AP in the tree. For any mesh AP which is a parent of more than one child mesh AP in the multicast tree, the next hop list for the tag need only include one of the child mesh APs, since the other child mesh APs will receive the packet sent by the parent mesh AP and examine its destination. If it is of a multicast address of a multicast tree to which such a child mesh AP belongs, the packet forwarding continues.

In the data plane processing of each mesh AP receiving a multicast tagged packet, if the mesh AP includes AP functionality, the data plane process includes translating the 4-address dot11 header (WDS) to a 3-address format (BSS), replacing the basic service set ID (BSSID) in the 3-address 802.11 header with its own BSSID, if client encryption is set up, carrying out the optional IEEE 801.11i encryption, and transmitting the frame over the air.

The data plane process includes looking up its tag database to see if there is a next hop list. If the next hop list is not null, such a null entry indicating this mesh AP is the leaf node of the tree, then the data plane process includes, in the case that hop-to-hop encryption is included, carrying out hop-by-hop 11i encryption with a multicast key, and also forwarding the packet by modifying the TA to be its BSSID, modifying the DA to be the multicast address, and transmitting the frame over the air. Note that all mesh APs on that radio channel would then receive the packet and ascertain whether to discard the packet based on whether they are part of the multicast tree.

Intra-Mesh Routing

As described above, the first time a packet whose source and destination are of clients of mesh APs within the mesh network traverses the upstream path to the controller, the controller's control plane process 233, in addition to providing a tagged path to the destination mesh AP, also determines one or more intra-mesh paths that do not include the controller 103. As described above, the controller 103's tag distribution process 237 includes sending each mesh AP in the determined paths the tag information. First the intermediate mesh APs are sent the tag information, then the endpoint mesh APs—in the example mesh AP 117 and 123—are sent the tag information. FIG. 4 shows the entries of the tag database 333 of mesh point 117, and includes tag entries 406 and 407 for classes Type1 and Type2, respectively, with tags denoted T6 and T7, respectively, and next hop upstream adjacency lists of one or more next hops addresses denoted List6 and List7, respectively. Note that these entries each have source and destination fields with entries client 119 and client 125, respectively. FIG. 5 shows the corresponding entries 506 and 507 for the Type1 and Type 2 tags T6 and T7, respectively, with next hop adjacency lists denoted List6_115 and List7_115. In addition, in one embodiment, reverse direction intra-mesh paths also are formed for Type1 traffic and Type2 traffic from client 125 back to client 119. So in FIGS. 4 and 5, the tag database of mesh APs 117 and 115 each respectively includes tag entries 406' and 407', and 506' and 507' for tags denoted T6' and T7' from with next hop adjacency lists denoted List6_115' and List7_115' in FIG. 5, and null in FIG. 4 for the Type1 and Type2 classes of traffic respectively.

Consider now the next time client 119 sends a traffic class Type1 packet to client 125. At the mesh AP 117's data plane process 331, the looking up of the tag database results in a match with the destination of client 125, class of traffic Type1, and the source client 119. The tag T6 is retrieved, and this tag is included in the tagged mesh packet. In this case, the packet is forwarded all the way to mesh AP 123 without traversing the controller using the intra-mesh path.

Note that in one embodiment described herein, referring to the illustrative example, only the tags between clients 119 and 125 are formed when the control plane process learns of the packet receipt destination to an intra-mesh client 125. In a given mesh network, tags are determined by tag class: the type and class of traffic and the level of service subscribed by the client. When a controller is informed of intra-mesh traffic from a source mesh AP to a destination mesh AP, it can, potentially, set up all possible tags between these pairs of mesh APs determined by all possible classes of service between all possible types of clients between these mesh APs. While such a scheme would provide pre-set tagged paths for all subsequent intra-mesh traffic between clients of the mesh AP pair with resulting low disruption, such a method would cause some possible delay the first time traffic is sent from the source mesh AP to the destination mesh AP, because this event would trigger tag computation and tag distribution along all these newly computed paths. While one possible embodiment of the invention includes such a computation, the inventors chose, in one embodiment, to not trigger such computation of all possible tags for traffic between the source and destination mesh APs. In one alternate embodiment, the control plane process at the controller 103, upon discovering intra-mesh traffic, computes only the tags relevant to the type of the client that initiated the intra-mesh traffic flow and for the specific quality of service demanded. In such an alternate embodiment, all new intra-mesh traffic might suffer some similar limited tag computation and distribution latencies, but lower than if computation of all tags were triggered. It should be noted, however, that the invention is not limited to only dynamic tag computation, or only computation of those specific tags for the class defined by the type of client and subscribed service level.

Redundancy and Broken Links

In one embodiment each tag can have more than one path in order to provide a level of fault tolerance. This is one feature of centralized routing. Several routes may be calculated between two end points, and ordered in order of preference. At any one point in the mesh network, the priority list of next hops can have one or more next hops ordered by the order of preference.

When the data plane process at any mesh AP discovers that the highest priority (or only) next hop in the tag table is unreachable, the data plane process informs the control plane process of the mesh AP that the link in the tagged path is broken. If there is another lower priority next hop in the list, the data plane process forwards the packet to such a next hop, else the data plane process discards the packet and indicates to the control plane process that the packet is being discarded.

The control plane process of the mesh AP indicates to the control plane process 233 of the controller 103 that a link in the indicated tag is down. As a result, the tag distribution process deletes the broken link from all tagged paths that include such a link, and sends tag control packets to all mesh APs that are included in the tagged paths that are so updated. Note that some tags may need to be deleted, e.g., if the broken link was the only link in a tagged path, and others would be updated.

Thus has been described a method of using tagged paths in wireless mesh networks, wherein the tags are formed by centrally controlled routing, and provide tagged packet forwarding in a wireless mesh network. Note that in different embodiments, the central routing can include features that may not be possible with distributed routing.

As an example, if MPLS is used, the status of various links in a mesh network changes frequently, and therefore, making sure all intermediate points are updated would lead to a lot of control information being maintained at the intermediate points, and being exchanged throughout the mesh network. As a result, the time taken for path computation to converge at all nodes after one or more disruptions could be substantially larger for MPLS compared to centralized routing embodiments described herein. In one embodiment of centralized routing described herein, only the route computations at the centralized router needs to converge following every disruption. In addition, since there are less number of control messages in such a centralized architecture, in an unreliable environment like a wireless mesh, the probability should be lower that the status update following a disruption will not be reported in time to the centralized node. Finally, since the report of a single disruption may need to reach multiple mesh nodes for de-centralized routing, if any of those messages do not arrive at a specific node in time, the route tables in such mesh nodes may be in inconsistent states for long, possibly causing several packets, potentially voice video, be misrouted and eventually dropped. In contrast, a centralized routing scheme, the centralized node may be more likely to be in consistent state, because it will either be updated or not after disruption. Inconsistency may result from slow or unreliable propagation of tag updates to mesh nodes, in which case, new tags/paths would be updated at the mesh nodes by the central tag computing node before the root AP is programmed with the change. In such an embodiment, as soon as the root AP is updated with new path information, new paths should be consistent and programmed, preventing inconsistency.

The final effect of faster path convergence and consistency is reduced route flapping in the mesh compared to alternate, distributed methods, meaning it may possible to guarantee services for mission critical applications such as voice and video.

Centrally controlled routing with tagged paths as described herein can be used to achieve per-destination address (DA) load balancing by tagged paths. Different embodiments of the invention also can be used to provide multiple redundant paths for mesh APs, leading to fault tolerance. In such a case, whenever one tagged adjacency fails, the data plane process can fall back to one of the secondary next hops for the tag and generate an alarm up to the controller for the broken route. For example, the same AP can have multiple tagged paths back to the root mesh AP and controller sorted by link metrics, or one or more other criteria. Different embodiments of the invention also can be used to achieve multiple tagged paths for QoS/policy based routing.

Different embodiment of the invention also can be used in architectures with multiple root mesh nodes or multiple sectors, such multiple sectors segregate by tags. How to use the description herein for such architectures would be clear to those in the art.

Note that in the embodiments described herein, the tag database of the mesh AP to which a destination client is associated includes an entry, even though the address of such a mesh AP is in the packet so that the mesh AP can otherwise determine that it is the final destination and that there is no next hop. The inventors decided to include such an entry to make the tag scheme self-sufficient, independent of the mesh routing protocol, and to make its use consistent across all nodes, including the final destination. Thus, the data plane process in one embodiment includes, even in the final destination mesh AP, lookup up the tag and, in the case of the final mesh AP, finding the next hop to be NULL to determine that it is the final destination.

While one example embodiment described herein uses mesh frames that use a 4-address WDS packet format, the invention is not restricted to any particular frame format. The example described herein and the intra-mesh routing described herein provides for layer-2 intra-mesh routing without requiring six-address mesh frame formats, or any other specialized mesh format, so that, for example, no specialized hardware that can handle six-address schemes need be used. However, the invention can still be used together with six-address packet addressing.

Furthermore, while one embodiment of the invention included the tag as a field in the CAPWAP preamble, in alternate embodiments, the tag is added as a separate unencrypted tag header added to the frame, and in another embodiment, the tag header is included in the main part of the packet, and the packet, if encrypted, is decrypted and re-encrypted by the mesh AP's data plane process at each hop.

While the example embodiments in the description herein described dynamic routing according to which tagged data paths for different classes of traffic are centrally formed by the centralized routing process 235 only after a client joins a mesh network by associating with a mesh AP, e.g., as a result of the client authenticating to the mesh network, in alternate embodiments, static routing also is included. Static routing includes pre-assigning paths for one or more classes of traffic. Thus, such pre-assigning does not require authentication of a client as is the case in the example embodiment described herein.

Furthermore, while the term "data" is used herein to describe data traffic, this does not limit to any particular type of data, and the invention is applicable to such types of data as voice data, video data, multimedia data, non-media data, and so forth.

Note that the terms "class" and "traffic class" when referring to paths and tags to or from a client refer to the a single class determined by one or more of class of service, type of traffic, type of client, and/or level of subscribed service for the client.

While the example embodiments in the description herein includes partitioning the processing at each mesh AP to process steps in a data plane process and process steps in a control plane process, the invention is not limited to such partitioning. Furthermore, even when the processes are so partitioned to data plane processing and control plane processing, the invention is not limited to different processors being used to implement the control plane processes and the data plane processes.

While the description herein assumes one controller, it may be that there are several controllers in the mesh network each controlling different mesh APs of the mesh network, e.g., each having a secure CAPWAP tunnel to one or more mesh APs. In such a multiple controller environment, there is one controller that carries out the routing for the mesh network. This is called the "master" controller, and is the controller that carries out the control plane centralized routing process and tag distribution process described herein. Those in the art would find it straightforward to modify the design described herein for a multiple controller architecture.

Furthermore, while one controller is master, in a multi-controller architecture, one embodiment includes at least one backup controller that provides redundancy, such that in the event the master controller in some way stops functioning, the backup controller takes over as the new, possibly temporary master controller.

Furthermore, while the description herein assumes one mesh sector with a single root mesh point (root AP), in a more complex environment, there may be more than one root AP. In one multi-root AP architecture, one controller is the master controller that carries out the control plane centralized routing process and tag distribution process described herein. Those in the art would find it straightforward to modify the design described herein for a multiple controller architecture.

Furthermore, while the description herein above assumes that in the data plane, all non-intra-mesh packets, and those intra-mesh packets whose complete path has not yet been tagged are directed to the controller, and that the data plane of the controller adds the tags for the path to the destination, in alternate embodiments of the invention, the root AP 111 is assumed to have a fast control plane and adapt plane sufficiently powerful such that all non-intra-mesh packets are passed via the root AP without being forwarded to the controller. Those in the art would fund it straightforward to modify the description herein to cover having such functionality in the root AP 111 rather than in the controller 103, so that further explanation is not needed.

While one embodiment uses AWPP (Adaptive Wireless Path Protocol) from Cisco Systems, Inc., Jose, Calif. to form the topology of the mesh network. Alternate embodiments can use different routing methods, e.g., PWRP (Predictive Wireless Routing Protocol) from Tropos Networks, of Sunnyvale, Calif.

Similarly, while one embodiment uses CAPWAP to communicate between the central controller and the mesh points, alternate embodiments use alternate protocols for communicating between a centralized mesh controller and the mesh points of a mesh network.

In one embodiment, a computer-readable carrier medium carries a set of instructions that when executed by one or more processors of a mesh node cause the one or more processors to carry out a method in the mesh node as described herein.

In the description herein, and in the claims, the term substantially conforming to a standard, or to a standard protocol, or to a standard w-way exchange, etc. is used. By "substantially" conforming is meant conforming to the overall structure, but one or more of adding one or more frame types not in the standard; modifying one or more frame types that are in the standard; adding at least one information element not in the standard to one or more frame types; adding one information element in the standard; adding at least one field not described in the standard; modifying the order of an exchange defined in the standard, using a conforming exchange defined in the standard, but with the entities somewhat different than defined in the standard. In most cases, a substantially conforming protocol would accept data that conforms to the standard, but not all features might be implemented. Such a meaning of substantially conforming would be well understood by those of ordinary skill in the art. As examples, the additional frame types, additional fields, and the type of exchanges defined herein may not all be strictly in conformance of the IEEE 802.11 standard. However, each are included in the term "substantially conforming."

"Variants of the IEEE 802.11 standard" as used herein means the variants and proposed variants of the IEEE 802.11 standard. Variants are versions defined in clauses of the standard and proposed amendments of the standard. For example, the six-address scheme described herein is part of a draft amendment to the IEEE 802.11 standard.

It should be appreciated that although embodiments of the invention have been described in the context of mesh networks that substantially conform to the IEEE 802.11 standard, alternative embodiments of the present invention are not limited to such contexts and may be utilized in various other applications and systems, whether conforming to an wireless standard, or especially designed. Furthermore, embodiments are not limited to any one type of architecture or protocol, and thus, may be utilized in conjunction with one or a combination of other architectures/protocols. For example, one embodiment may be embodied in transceivers conforming to other standards and for other applications, including other WLAN standards, WiMAX, bluetooth, GSM, PHS, CDMA, and other cellular wireless telephony standards. While an embodiment has been described for operation in a mesh point with RF frequencies in the 5 GHz range and 2.4 GHz range (the 802.11a and 802.11g variants of the IEEE 802.11 standard), other embodiments may be embodied in receivers and transceivers operating in other RF frequency ranges. Applications that can be accommodated include IEEE 802.11 wireless LANs and links, wireless Ethernet, HIPERLAN 2, WiMAX, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

Furthermore, the mesh points in a mesh network have been termed mesh APs herein. It is understood that such "mesh APs" need not all have AP capabilities, so may act as simple replay mesh points for the backhaul of the mesh network.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Note that the description has been mostly for mesh APs that are controlled by a controller with which the mesh AP has a secure tunnel, e.g., an LWAPP/CAPWAP tunnel. First, the invention is also applicable to mesh nodes that do not include access point functionality—such mesh nodes are still called mesh AP in the above description. Furthermore, the invention is also applicable to mesh nodes that are not "lightweight" but rather include enough capability to not need an LWAPP or other protocol connection for a controller to function. For example, in the case access point capability is included, certain aspects of the present invention may also be applicable also to mesh APs that are not lightweight APs.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of mesh node. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing a set of instructions for execution by one or more of the processors and that cause the one or more processors to perform any one or more of the methodologies of the present invention. A carrier medium may take many forms, including but not limited to, non-volatile media and volatile media. Non-volatile media includes, for example, optical, magnetic disks, and magneto-optical disks. Volatile media includes dynamic memory, such as main memory. For example, the term "carrier medium" shall accordingly be taken to include, but not be limited to, (i) in one set of embodiment, a tangible computer-readable storage medium, e.g., a solid-state memory, or a computer software product encoded in computer-readable optical or magnetic media.

It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term "coupled", when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating a processing system including one or more processing elements to a wireless mesh network to control the wireless mesh network, including controlling at least part of packet routing in the mesh network, the method comprising:
   at least one processing element of the processing system receiving from each mesh point of the wireless mesh network information sufficient to determine a map of mesh points and one or more available wireless links between the mesh points, the mesh points of the wireless mesh network including a root mesh point and one or more additional mesh points;
   in response to detecting that a client of a particular mesh point that has access point capabilities is joining the mesh network, using a centralized routing process to determine at least one path from the client to the root mesh point for at least one traffic class;
   at least one processing element of the processing system assigning an upstream tag to one or more determined paths for each traffic class from the client, such that each assigned upstream tag has at least one corresponding upstream path; and
   for each upstream tag, at least one processing element of the processing system sending to at least each mesh point in the upstream tag's one or more paths tag information on the upstream tag, such that a receiving mesh point can store forwarding information for the upstream tag, including the upstream tag of the path, and one or more immediate next hops of the receiving mesh point for the corresponding path or paths of the upstream tag,
   wherein a packet that has been tagged to include a tag is forwardable by a receiving mesh point that stores forwarding information by the receiving mesh point looking up the tag in its stored forwarding information to determine the next hop for the tagged packet, and the receiving mesh point forwarding the tagged packet to the next hop.

2. A method as recited in claim 1, further comprising:
   using the centralized routing process to determine at least one path from the root mesh point to the client for each traffic class for the client;
   assigning a downstream tag to one or more determined paths for the same traffic class for the client, each such assigned tag having at least one corresponding downstream path; and
   for each tag, sending to the at least each mesh point in the downstream tag's one or more paths tag information on the downstream tag including for each mesh point, such that a receiving mesh point can store forwarding information for the downstream tag, including the tag of the path, and one or more immediate next hops of the mesh point for the path or paths of the downstream tag.

3. A method as recited in claim 1,
   wherein the mesh points of the mesh network are controlled by the at least one controller using control messages between the at least one controller and the mesh points, and wherein the centralized routing process is configured to determine paths for control messages and paths for one or more classes of data traffic.

4. A method as recited in claim 2,
   wherein the mesh network is controlled by at least one controller, and wherein the downstream paths are from at least one of the controllers via the root mesh point and the upstream paths are from the at least one controller via the root mesh point.

5. A method as recited in claim 2, further comprising:
receiving information that a packet of a traffic class of a first client has traversed the mesh from the first client to a second client;
using the centralized routing process to determine one or more intra-mesh paths for the traffic class;
associating a tag for each direction of traffic between the first and second clients; and
distributing tag information to the mesh points in the determined intra-mesh paths so that a packet from either client can be tagged and then forwarded to the other client without having to traverse the root mesh point.

6. A method as recited in claim 2, further comprising:
receiving an indication of a particular next link in a tagged path is broken;
modifying or deleting each tagged path that includes the particular next link; and
distributing tag information to any mesh points in any modified or deleted paths.

7. A method as recited in claim 2, wherein at least some of the next hop information of a tag includes more than one next hop in a priority order with a highest priority next hop and a next highest priority next hop, such that in the case the highest priority next hop is not reachable, a tagged packet is forwarded to the next highest priority next hop.

8. A method of operating a processing system including one or more processing elements to a wireless mesh network to control the wireless mesh network, including controlling at least part of packet routing in the mesh network, the method routing packets in the wireless mesh network, the method comprising:
at least one processing element of the processing system detecting that a mesh point has joined the mesh network via a parent mesh point, and in response to the detecting, setting up a control path for control messages to control the discovered mesh point; and
at least one processing element of the processing system detecting that a client is joining the mesh network via a particular discovered mesh point that has access point functionality, and in response to the detecting that the client is joining the mesh network, assigning a tag for the client for a class of traffic in the upstream direction, the tag defining at least one centrally determined upstream path between the client and the root mesh point of the mesh network for the type of client traffic and the level of service subscribed by the client,
wherein tag information on assigned tags is distributed to each mesh point in each path defined by the tag, the tag information including at least one next hop for the path,
wherein a packet transmitted in the upstream direction for the type of client traffic and the level of service of the tag can be tagged at the particular discovered mesh point, and
wherein a tagged packet received by one or more mesh points in at least one path of the tag of the tagged packet can be forwarded by each of the one or more mesh points in the at least one path of the tag by the receiving mesh point looking up the tag and the receiving mesh point forwarding to the next hop of the tag.

9. A method comprising:
receiving at a first mesh point of a wireless mesh network a packet, the mesh network including a root mesh point and one or more other mesh points;
ascertaining if the received packet includes a tag, and in the case that the packet includes a tag, looking up a tag data structure maintained in the first mesh point, the data structure containing tag entries each including a tag and forwarding information, each tag entry corresponding to one or more paths from a source to a destination; and
in the case that the looking up results in a matched tag entry that includes an indication of a next hop mesh point in the forwarding information, forwarding the packet to the next hop mesh point of the matched tag entry,
wherein the tag data structure is formed from tag information received from a central controller, and
wherein the forwarding information to at least one next hop mesh points of each tag entry in the tag data structure is part of at least one path for the tag determined by the central controller using a central routing method for a traffic class, and distributed by the central controller as tag information to mesh points in the path or paths of the tag.

10. A method as recited in claim 9, wherein the first mesh point includes access point functionality, further comprising ascertaining whether the packet is to a client of the first mesh point, and in the case that the packet is to a client of the first mesh point, removing any tag in the packet, and transmitting the packet to the client of the first mesh point.

11. A method as recited in claim 9, wherein the first mesh point includes access point functionality, and wherein the tag data structure includes entries for any clients of the first mesh point that includes an indication of the source and of the traffic class, the method further comprising:
receiving a client packet from a first client of the first mesh point for a first class of traffic; and
looking up the tag data structure to ascertain whether there is a tag entry for the source being the first client for the first traffic class, and in the case that a match is found, adding the tag of the matched entry to the received packet to form a tagged packet, retrieving forwarding information including a next hop from the matched tag entry, and forwarding the packet to the next hop of the matched tag entry.

12. A method as recited in claim 9,
wherein the first mesh point includes access point functionality, and
wherein the tag information is formed by a process at the central controller including:
receiving from each mesh point of a wireless mesh network information sufficient to determine a map of all mesh points and the available links between the mesh points, the mesh points of the wireless mesh network including a root mesh point and one or more additional mesh points;
in response to detecting that a client of a particular mesh point that has access point capabilities is joining the mesh network, using the centralized routing process to determine at least one path from the client to the root mesh point for at least one traffic class; and
assigning an upstream tag to one or more determined paths for each traffic class from the client, such that each assigned upstream tag has at least one corresponding upstream path; for each upstream tag, sending to at least each mesh point in the upstream tag's one or more paths tag information on the upstream tag.

13. A method as recited in claim 12, wherein the process at the central controller further includes:

using the centralized routing process to determine at least one downstream path from the root mesh point to the client for each traffic class for the client;

using the centralized routing process to determine at least one upstream path to the root mesh point from the client for each traffic class for the client;

assigning a downstream tag to one or more determined downstream paths for the same traffic class for the client, such each assigned downstream tag has at least one corresponding downstream path; and assigning a upstream tag to one or more determined upstream paths for the same traffic class for the client, such each assigned upstream tag has at least one corresponding upstream path; and for each tag, sending to the at least each mesh point in the tag's one or more paths tag information on the tag.

14. A method as recited in claim 9, wherein the first mesh point of the mesh network is controlled by the controller using control messages between the controller and the first mesh points, and wherein the centralized routing process is configured to determine paths for control messages and paths for one or more classes of data traffic.

15. A method as recited in claim 13, wherein the mesh network is controlled by a controller, and wherein the downstream paths are from the controller via the root mesh point and the upstream paths are from the controller via the root mesh point.

16. A method as recited in claim 11, wherein the looking up of the tag data structure to ascertain whether there is a tag entry for the source being the first client first includes ascertaining if there is an entry for one or more intra-mesh paths with the destination of the client packet as the destination of the intra-mesh paths.

17. A non-transitory computer-readable storage medium configured with instructions that when executed by one or more processors cause a first wireless mesh point of a wireless mesh network to:

receive a packet at the first mesh point, the mesh network including a root mesh point and one or more other mesh points;

ascertain if the received packet includes a tag, and in the case that the packet includes a tag, look up a tag data structure maintained in the first mesh point, the data structure containing tag entries each including a tag and forwarding information, each tag entry corresponding to one or more paths from a source to a destination; and in the case that the looking up results in a matched tag entry that includes an indication of a next hop mesh point in the forwarding information, forwarding the packet to the next hop mesh point of the matched tag entry, wherein the tag data structure is formed from tag information received from a central controller, and wherein the forwarding information to at least one next hop mesh points of each tag entry in the tag data structure is part of at least one path for the tag determined by the central controller using a central routing method for a traffic class, and distributed by the central controller as tag information to mesh points in the path or paths of the tag.

18. A non-transitory computer-readable storage medium as recited in claim 17, wherein the first mesh point includes access point functionality, and wherein the tag data structure includes entries for any clients of the first mesh point that includes an indication of the source and of the traffic class, wherein the instructions when executed further cause the first wireless mesh point to:

receive a client packet from a first client of the first mesh point for a first class of traffic; and look up the tag data structure to ascertain whether there is a tag entry for the source being the first client for the first traffic class, and in the case that a match is found, adding the tag of the matched entry to the received packet to form a tagged packet, retrieving forwarding information including a next hop from the matched tag entry, and forwarding the packet to the next hop of the matched tag entry.

* * * * *

UNITED STATES PATENT AND TRADEMARK OFFICE
CERTIFICATE OF CORRECTION

PATENT NO. : 7,839,856 B2
APPLICATION NO. : 11/758990
DATED : November 23, 2010
INVENTOR(S) : Sinha et al.

Page 1 of 1

It is certified that error appears in the above-identified patent and that said Letters Patent is hereby corrected as shown below:

Column 24 lines 4-24 should read as follows:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any non-transitory medium that is capable of storing a set of instructions for execution by one or more of the processors and that cause the one or more processors to perform any one or more of the methodologies of the present invention. A carrier medium may take many forms, including but not limited to, non-volatile media and volatile media. Non-volatile media includes, for example, optical, magnetic disks, and magneto-optical disks. Volatile media includes dynamic memory, such as main memory. For example, the term "carrier medium" shall accordingly be taken to include, but not be limited to, (i) in one set of embodiment, a ~~tangible~~ non-transitory computer-readable storage medium, e.g., a solid-state memory configured with instructions for execution by one or more of the processors and that cause when executed performing any one or more of the methodologies of the present invention, or ~~a computer software product encoded in~~ one or more computer-readable optical or magnetic media configured with instructions for execution by one or more of the processors and that cause when executed performing any one or more of the methodologies of the present invention.

Signed and Sealed this
Thirtieth Day of August, 2011

David J. Kappos
*Director of the United States Patent and Trademark Office*